United States Patent

Roth-Stielow et al.

[11] Patent Number: 6,081,086
[45] Date of Patent: Jun. 27, 2000

[54] METHOD AND APPARATUS FOR ELECTRICALLY BRAKING A MOTOR

[75] Inventors: Jörg Roth-Stielow, Bretten; Josef Schmidt, Graben-Neudorf, both of Germany

[73] Assignee: Sew-Eurodrive GmbH & Co., Bruchsal, Germany

[21] Appl. No.: 09/159,253

[22] Filed: Sep. 23, 1998

[30] Foreign Application Priority Data

Sep. 25, 1997 [DE] Germany .................. 197 42 426

[51] Int. Cl.$^7$ ...................................... H02P 3/18
[52] U.S. Cl. .................. 318/375; 318/138; 318/254; 318/798; 318/803; 318/811; 318/808
[58] Field of Search .................. 318/375, 138, 318/254, 798, 803, 811, 808

[56] References Cited

U.S. PATENT DOCUMENTS

| | | | |
|---|---|---|---|
| 3,715,642 | 2/1973 | Walter | 318/269 |
| 4,163,181 | 7/1979 | Farber | 318/245 |
| 4,638,397 | 1/1987 | Foley | 361/230 |
| 4,649,736 | 3/1987 | Austin | 73/29 |
| 5,193,388 | 3/1993 | Kleinhans | 73/204.14 |
| 5,847,533 | 12/1998 | Hakala et al. | 318/798 |

FOREIGN PATENT DOCUMENTS

| | | |
|---|---|---|
| 34955 | 6/1908 | Austria . |
| 0773623 A1 | 5/1997 | European Pat. Off. . |

*Primary Examiner*—Karen Masih
*Attorney, Agent, or Firm*—Marshall, O'Toole, Gerstein, Murray & Borun

[57] ABSTRACT

Converter-powered electric motors are often braked by electrical means. For this purpose the electronic converter that powers the motor is so controlled that the motor, when in generational operation, sends energy by way of the converter into an electrical braking resistor additionally connected to the converter, and this energy is there converted to heat. In order to avoid overloading the electrical braking resistor, an additional electronic or thermomechanical protective device is customarily provided. To simplify the arrangement, it is proposed in the present invention to provide as an electric braking resistor one made of a resistive material with a conductance that decreases progressively as the temperature rises through a certain range below the maximal acceptable operating temperature of the braking resistor. As a result, the power that can be accepted by the electrical braking resistor is made self-limiting, so that the braking resistor is protected against overheating.

17 Claims, 3 Drawing Sheets

METHOD AND APPARATUS FOR ELECTRICALLY BRAKING A MOTOR

FIELD OF THE INVENTION

The present invention relates to a method and apparatus for electrically braking an electric motor powered by a converter.

DESCRIPTION OF THE PRIOR ART

Electric motors, in particular electric motors that are powered by a converter, are often braked electrically. For this purpose an electrical braking resistor is connected to the electronic converter that powers the motor. The converter is controlled in such a way that the motor, when in generational operation, provides energy to the braking resistor by way of the converter. The braking energy is converted to heat in the braking resistor and released to the surroundings.

In order to prevent overloading of the electrical braking resistor, a supplementary electronic or thermomechanical protective device such as a thermal switch is customarily provided. Because of this increase in complexity, the size of the apparatus becomes greater and its cost higher. Installation costs must also be taken into account.

An object of the present invention is to provide a method and an apparatus for electrically braking an electric motor powered by a converter which results in a reduction in manufacturing and installation costs over conventional methods and apparatus.

SUMMARY OF THE INVENTION

According to a first aspect of the present invention there is provided apparatus for the electrical braking of an electric motor powered by a converter comprising an electrical braking resistor with an electrical conductance which, in a temperature range below a maximum acceptable operating temperature of the braking resistor, decreases progressively with increasing temperature; and a control means for controlling the power deliverable to the braking resistor.

According to a second aspect of the present invention there is provided a method of electrically braking an electric motor powered by a converter in which a resistor with an electrical conductance that decreases progressively with rising temperature in a temperature range below a maximal acceptable operating temperature is used as an electrical braking resistor.

In the invention a particular resistive material that has a positive temperature coefficient, which increases as the temperature rises, is used for the braking resistor. As a result, the electrical braking resistor "turns off" independently, so to speak, when its temperature rises into an unacceptably high range. The resistor used here is preferably a PTC resistor made of semiconductor material, such as is known per se.

Preferably, the braking resistor and the control means are so constructed that the temperature $\vartheta$ at which a first function $G_{el}(\vartheta) \cdot (U_{zmax})^2$ intersects a second function $P_{el}(\Delta\vartheta) = P_{el}(\vartheta - \vartheta_{Umax})$ is no higher than a maximal acceptable operating temperature $\vartheta_{Bmax}$ of the braking resistor, where $G_{el}(\vartheta)$ is the conductance of the braking resistor at a very simple controlling device, which preferably comprises an electronic on-off switchable, one-way valve connected in series to an oppositely oriented diode; the output voltage of the d.c. intermediate circuit is applied across this series arrangement, the braking resistor being connected parallel to the diode. By appropriately controlling the relative timing with which the one-way valve is switched on and off, the power applied to the braking resistor can easily be adjusted.

An embodiment of the invention will not be described by way of example with reference to the accompanying drawings.

DESCRIPTION OF A PREFERRED EMBODIMENT

Figure 1:
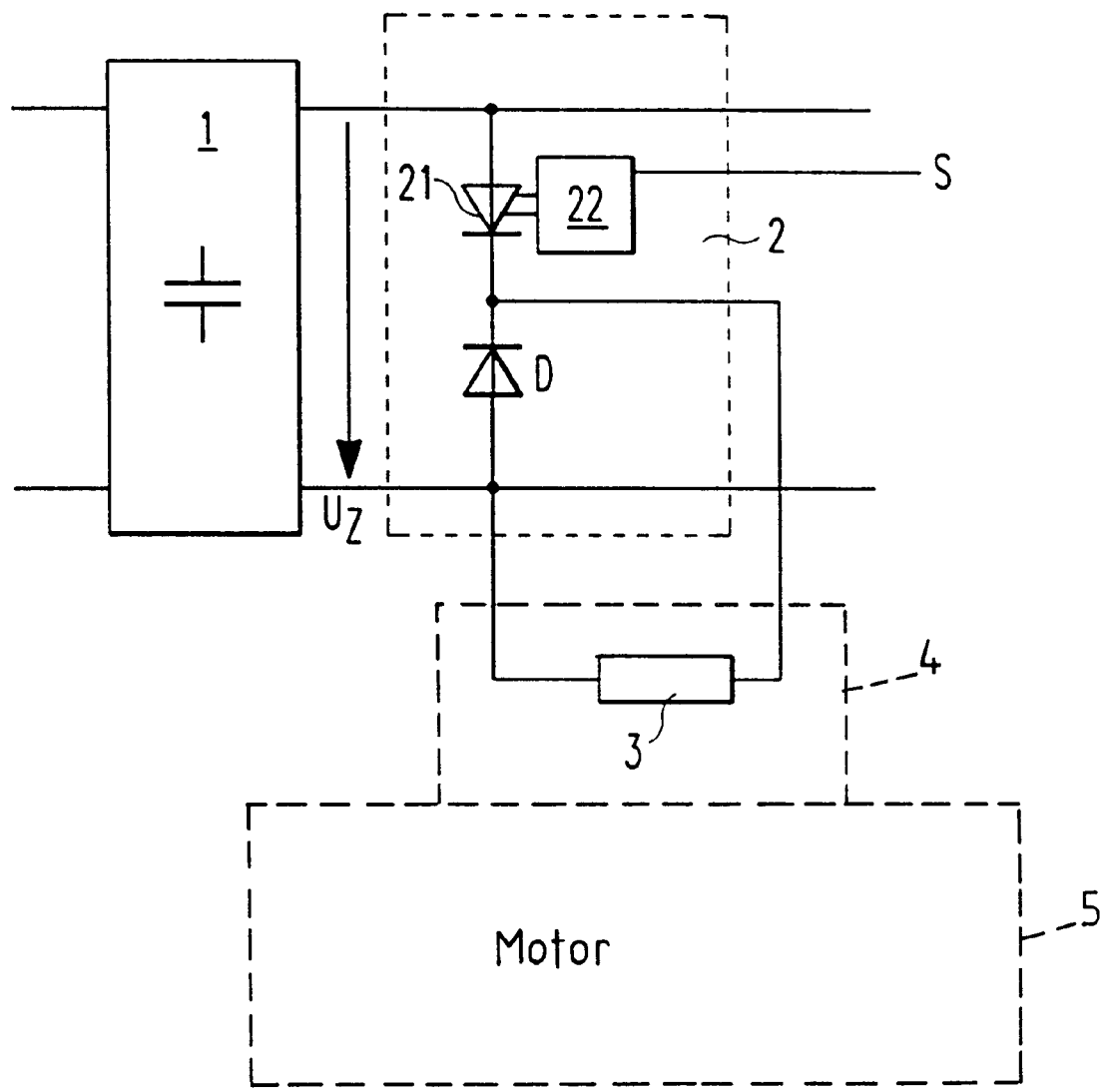
FIG. 1 is a partial circuit diagram of an embodiment of the present invention.

In the drawings, the reference numeral 1 indicates a temperature $\vartheta$;

$U_{Zmax}$ is the maximal voltage that can be delivered from the control means to the braking resistor; and $P_{el}(\Delta\vartheta)$ is the electrical power that must be supplied to the braking resistor in order to raise the temperature of the resistor material by $\Delta\vartheta°$ K. $\Delta\vartheta$ signifies the difference between the temperature of the braking resistor and the highest ambient temperature to be expected. In particular, a semiconductor material is preferred that is so doped that its resistance below $\vartheta_{Umax}$ increases progressively with $\vartheta$, although in a still lower, normal temperature range it increases only slightly with rising $\vartheta$, or does not increase or it even decreases.

This characteristic ensures that the braking resistor will be optimally utilized, depending on the maximal ambient temperature that is expected. If the maximal expected ambient temperature is high, the arrangement is so affected that the braking resistor can accept less energy or power than at a lower ambient temperature. It should also be mentioned here that the term "ambient" refers to everything in the surroundings that can thermally influence the braking resistance.

Preferably, the braking resistor is mounted directly on the housing of an electric motor, advantageously in the terminal box, in such a way that the maximal ambient temperature corresponds to the maximal temperature of the motor housing, which is the case if the heat transmission resistance between the material of the braking resistor, its housing and the mounting surface (motor housing) is very low. This can be ensured by known means.

Preferably the control means for the braking resistor is connected to a d.c. intermediate circuit of the converter. This arrangement makes it possible to provide a d.c. intermediate circuit present in conventional converters for electric motors. Between the output terminals of the d.c. intermediate circuit 1 is a d.c. voltage $U_z$. To these terminals are connected in series an electronic one-way valve 21, which can be switched on and off, and a diode D arranged so that its conduction direction is opposite to that of the one-way valve 21. The one-way valve 21 is switched on and off by a drive unit 22, with a timing that can be adjusted externally by way of a control lead S so as to achieve the desired braking action.

Connected in parallel to the diode D is a braking resistor 3. The diode D, the electronic on-off valve 21 and its drive unit 22 constitute a control means or brake chopper unit to control the power that is delivered to the electrical braking resistor 3. Preferably, the resistor 3 is mounted a terminal box 4 of an electric motor 5.

Whenever strong braking is desired, a corresponding control signal S is sent to the drive unit 22, which, in an extreme case, keeps the electronic on-off, one-way valve 21 open. Under these conditions the entire output voltage $U_z$ of the d.c. intermediate circuit 1 is applied to the braking resistor 3. When less braking power is desired, the one-way valve 21 is repeatedly switched on and off by the drive unit 22 in such a way that the relative durations of its open and closed times produce the desired degree of braking. For example, if only half of the maximum possible braking action is desired, the opening and closing of the valve are timed such that, on average, one-quarter of the output voltage $U_z$ of the d.c. intermediate circuit 1 is applied to the resistor 3.

Figure 2:
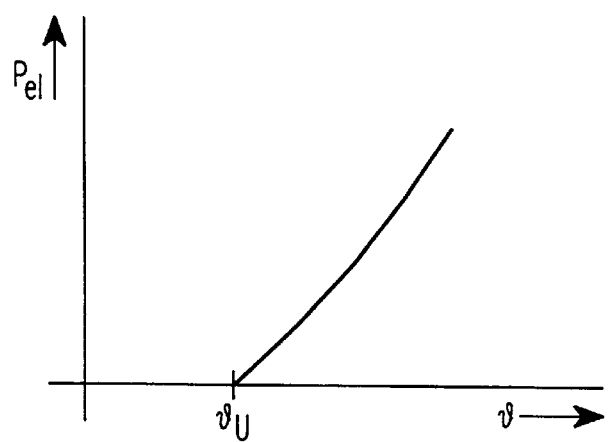
FIG. 2 is a graph of the power that must be supplied to an electrical resistor in order to heat it to a given temperature.

The braking resistor 3 comprises a semiconductor material, known per se, with a positive temperature coefficient, i.e. it comprises a PTC resistor. Because there is some heat-transmission resistance between the material of which the PTC resistor is made and its surroundings, i.e. the housing of the braking resistor, and between this housing and the base on which it is mounted, i.e. the housing of an electric motor, a certain amount of electrical power $P_{el}$ must be provided to the resistor in order to bring about any temperature increase $\Delta\vartheta$ at all of the resistor material at any given ambient temperature (in this case the temperature of the electric-motor housing). The function $y=P_{el}(\Delta\vartheta)=P_{el}(\vartheta-\vartheta_u)$ rises strictly monotonically. Whenever the temperature $\vartheta$ of the resistor material corresponds to the ambient temperature $\vartheta_u$, $P_{el}(\Delta\vartheta)=0$. This is shown diagrammatically in FIG. 2.

Figure 3:
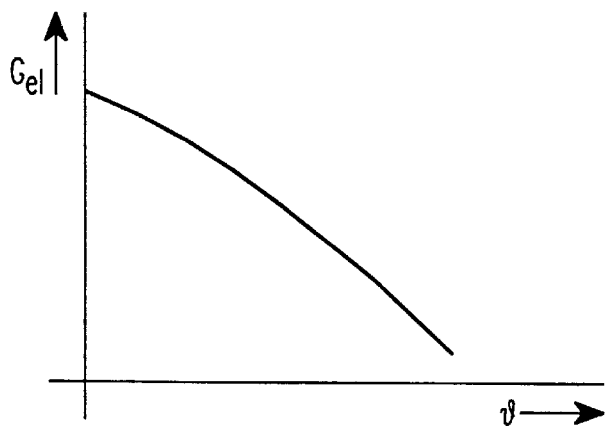
FIG. 3 is a graph of the electrical conductance of a PTC resistor as a function of temperature.
Figure 4:
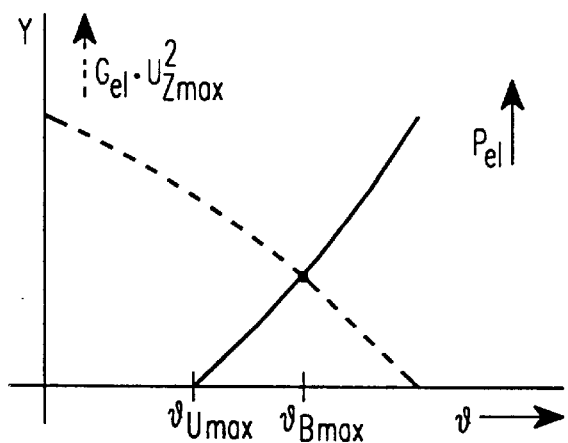
FIG. 4 is a graph relating conductance and power to temperature in an arrangement in accordance with the invention.

The material of which the PTC resistor is made has an electrical conductance $G_{el}$ that varies with temperature as shown in FIG. 3. This electrical conductance $G_{el}$ declines in a strictly monotonic manner as the temperature $\vartheta$ of the resistor material rises.

The resistor material is selected such that, under the prevailing conditions of mounting and heat transfer, at the maximal expected ambient temperature $\vartheta_{Umax}$ the abscissa of the point at which the function $Y1=G_{el}(\vartheta)\cdot(U_{Zmax})^2$ intersects the function $Y2=P_{el}(\Delta\vartheta)=P_{el}(\Delta\vartheta/\vartheta_{Umax})$ is no higher than the maximal acceptable operating temperature $\vartheta_{Bmax}$ of the electrical braking resistor, or of the material of which it is composed; that is, this value is no higher than the temperature at which the resistor material is destroyed. This dimensioning ensures that it is impossible under any conditions for the braking resistor to be destroyed because so much power is applied to it that the heat developed cannot be dissipated. Its resistance quite simply becomes so high that the voltage that can be applied to the braking resistor 3 from the d.c. intermediate circuit by way of the controlling device is insufficient to heat the resistor beyond its destruction temperature.

Figure 5:
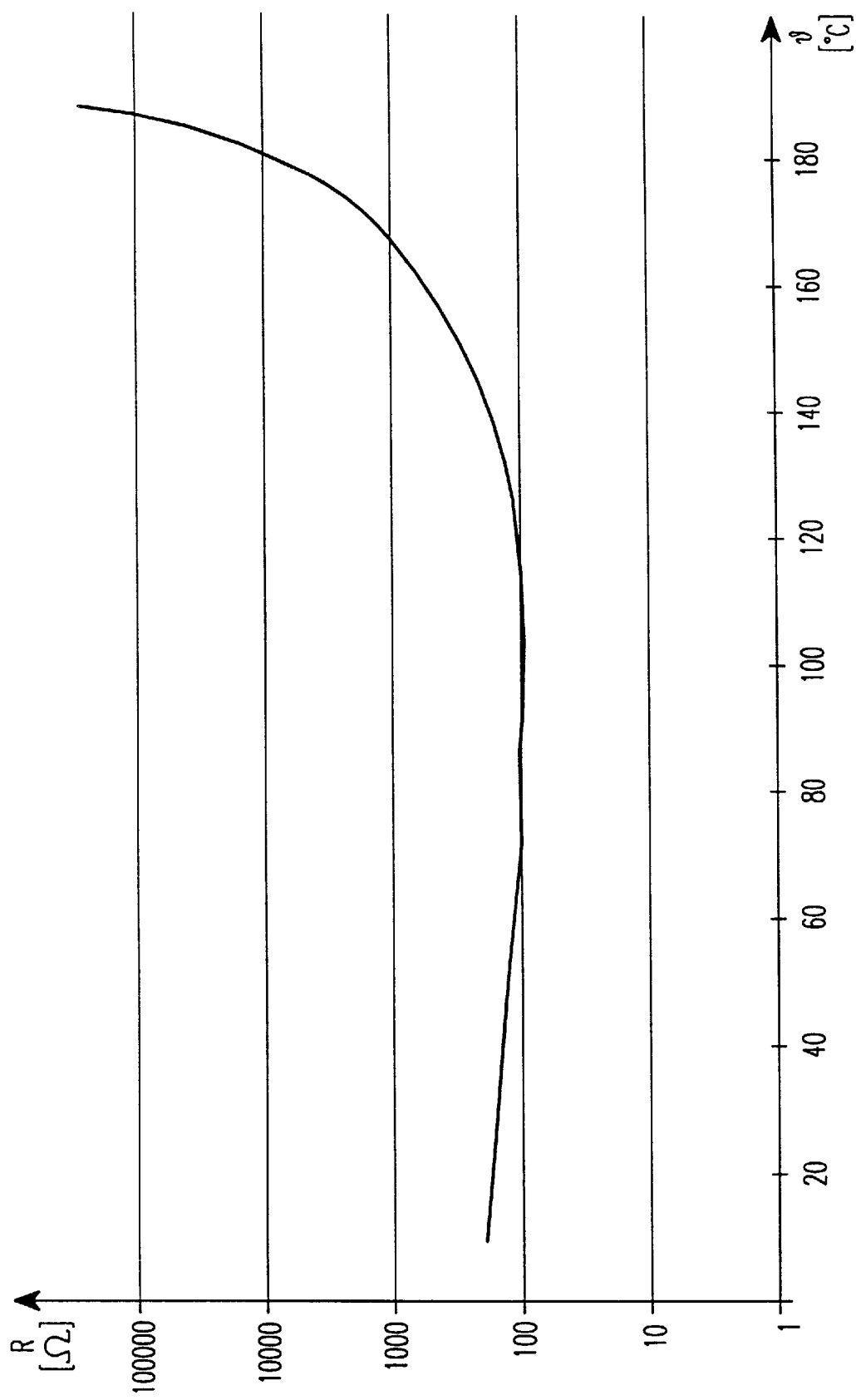
FIG. 5 is a graph showing a resistance-vs.-temperature curve of a preferred braking resistor.

FIG. 5 shows the relation between resistance and temperature for a semiconductor resistor made of doped semiconductor material that is preferred for use as a braking resistor. The maximal allowable operating temperature $\vartheta_{Bmax}$ is about 180° C. In the temperature range immediately below $\vartheta_{Bmax}$ the resistance increases progressively with $\vartheta$. In a lower temperature range between about 40° C. and 100° C., in which the braking resistor normally operates, the resistance actually decreases slightly with $\vartheta$. This feature guarantees that in normal operation a sufficient braking action will be available, and that the braking resistor is not overloaded or destroyed by a temperature increase beyond $\vartheta_{Bmax}$.

What is claimed is:

1. An apparatus for the electrical braking of an electric motor powered by a converter, comprising:
    an electrical braking resistor with a resistance which does not increase during the resistor's normal operating temperature range, but which increases as the temperature of the resistor gets closer to its maximum acceptable operating temperature so that the resistor's resistance becomes so high that any power reasonably expected to be applied to the resistor will not damage the resistor; and
    a control means for controlling the power deliverable to the braking resistor;
    wherein the converter comprises a d.c. intermediate circuit to which the control means is connected; and
    wherein the control means comprises an electronic on-off switchable, one-way valve connected in series with an oppositely oriented diode to which the braking resistor is connected in parallel and to which an output voltage of the d.c. intermediate circuit is applied.

2. Apparatus as claimed in claim 1, wherein the electrical resistance of the braking resistor at a maximum acceptable operating temperature is predetermined so that the maximum acceptable operating temperature is not exceeded when the one-way valve is permanently turned on at the highest expected ambient temperature.

3. Apparatus as claimed in claim 2, wherein the highest expected ambient temperature is assumed to be the maximal temperature of the motor housing.

4. The apparatus as claimed in claim 1, wherein the resistor's normal operating temperature range is between 40 and 100° C. and where the maximum acceptable operating temperature of the resistor is 180° C.

5. An apparatus for the electrical braking of an electric motor powered by a converter, comprising:
    an electrical braking resistor with a resistance which does not increase during the resistor's normal operating temperature range, but which increases as the temperature of the resistor gets closer to its maximum acceptable operating temperature so that the resistor's resistance becomes so high that any power reasonably expected to be applied to the resistor will not damage the resistor; and
    a control means for controlling the power deliverable to the braking resistor;
    wherein the braking resistor and the control means are so constructed that a temperature $\vartheta$ at which a first function
    $$y=G_{el}(\vartheta)\cdot(U_{Zmax})^2$$
    intersects a second function
    $$y=P_{el}(\Delta\vartheta)=P_{el}(\Delta\vartheta-\vartheta_{Umax})$$
    is no higher than a maximal acceptable operating temperature $\vartheta_{Bmax}$ of the braking resistor, where
        $G_{el}(\vartheta)$ is the conductance of the braking resistor at a temperature $\vartheta$,
        $U_{Zmax}$ is the maximal voltage that can be delivered from the control means to the braking resistor,
        $\vartheta_{Umax}$ is the maximal ambient temperature to be expected, and
        $P_{el}(\Delta\vartheta)$ is the electrical power that must be supplied to the braking resistor in order to raise the temperature of the resistor material by $\Delta\vartheta°$ K.

6. A method of electrically braking an electric motor powered by a converter comprising the step of shunting the motor current to a resistor with a resistance which does not increase during the resistor's normal operating temperature range but which increases as the temperature of the resistor gets closer to its maximum acceptable operating temperature so that the resistor's resistance becomes so high that any power reasonably expected to be applied to the resistor will not damage the resistor.

7. A method as claimed in claim 6, wherein the braking resistor comprises a semiconductor material.

8. A method as claimed in claim 6, wherein the normal operating range is between 40 and 100 C. and where the maximum acceptable operating temperature of the resistor is 180° C.

9. An apparatus for the electrical braking of an electric motor powered by a converter comprising:

an electrical braking resistor; and a control means for controlling the power deliverable to the braking resistor, wherein the braking resistor at a temperature $\vartheta$ in the range from $\vartheta_1$ to $\vartheta_{Bmax}$ has an electrical conductance that decreases as the temperature $\vartheta$ rises, with a differential conductance change, i.e., a conductance change per degree Celsius, such that the amount of this differential conductance change increases with rising temperature $\vartheta$, wherein $\vartheta_1$ is a certain fixed temperature that is smaller than $\vartheta_{Bmax}$, and depends on the resistor material, on the dimensioning and on the overall construction of the apparatus, and wherein $\vartheta_{Bmax}$ is a temperature such that when it is exceeded, components of the braking resistor can change irreversibly, the braking resistor can be destroyed and other parts can be destroyed, in particular $\vartheta_{Bmax}$ is above the ambient temperature and is within the range from 120° C. to 200° C.

10. The apparatus as claimed in claim 9, wherein the braking resistor comprises a semiconductor material.

11. The apparatus as claimed in claim 9, wherein the braking resistor is adapted for direct connection to a housing of the electric motor to be braked in order that the temperature of the surroundings into which the heat of operation of the braking resistor is to be dissipated corresponds to the temperature of the motor housing.

12. The apparatus as claimed in claim 9, wherein the converter comprises a d.c. intermediate circuit to which the control means is connected.

13. The apparatus as claimed in claim 12, wherein the control means comprises an electronic on-off switchable, one-way valve connected in series with an oppositely oriented diode to which the braking resistor is connected in parallel and to which an output voltage of the d.c. intermediate circuit is applied.

14. The apparatus as claimed in claim 13, wherein the electrical resistance of the braking resistor at a maximum acceptable operating temperature is predetermined so that the maximum acceptable operating temperature is not exceeded when the one-way valve is permanently turned on at the highest expected ambient temperature ($\vartheta_{umax}$):

wherein $\vartheta_{umax}$ is a temperature of the surroundings such that when it is exceeded, the entire arrangement, comprising converter, motor, braking resistor, with and without brake, cannot be operated with nominal data, in particular nominal performance, in particular $\vartheta_{umax}$ is a temperature in the range from 40° C. to 80° C.

15. The apparatus as claimed in claim 14, wherein the highest expected ambient temperature is assumed to be the maximal temperature of the motor housing ($\vartheta_{umax}$):

wherein $\vartheta_{Motor}$ is a temperature of the motor housing such that when it is exceeded, the motor cannot be operated with nominal data, in particular nominal performance, in particular $\vartheta_{Motor}$ is a temperature in the range from 60° to 100° C.

16. The apparatus as claimed in claim 9, wherein the braking resistor is adapted to be mounted in a terminal box of the electric motor.

17. The apparatus as claimed in claim 9, wherein the braking resistor and the control means are so constructed that a temperature $\vartheta$ at which a first function $$y=G_{el}(\vartheta)\cdot(U_{Zmax})^2$$

intersects a second function $$y=P_{el}(D\vartheta)=P_{el}(D\vartheta-\vartheta_{Umax})$$

is no higher than a maximal acceptable operating temperature $\vartheta B_{max}$ of the braking resistor, where $G_{el}(\vartheta)$ is the conductance of the braking resistor at a temperature $\vartheta$, $U_{Zmax}$ is the maximal voltage that can be delivered from the control means to the braking resistor, $\vartheta_{Umax}$ is the maximal ambient temperature to be expected, and $P_{el}(D\vartheta)$ is the electrical power that must be supplied to the braking resistor in order to raise the temperature of the resistor material by $D\vartheta°$ K.

* * * * *

UNITED STATES PATENT AND TRADEMARK OFFICE
CERTIFICATE OF CORRECTION

PATENT NO. : 6,081,086
DATED : June 27, 2000
INVENTOR(S) : Roth-Steilow, et al.

It is certified that error appears in the above-identified patent and that said Letters Patent is hereby corrected as shown below:

Claim 9, line 12, delete "$\vartheta_{Bmax}$-", and substitute therefor -- $\vartheta_{Bmax}$ --.

Signed and Sealed this

Seventeenth Day of April, 2001

Attest:

NICHOLAS P. GODICI

*Attesting Officer*  *Acting Director of the United States Patent and Trademark Office*